United States Patent [19]
Joshi et al.

[11] Patent Number: 5,997,596
[45] Date of Patent: Dec. 7, 1999

[54] OXYGEN-FUEL BOOST REFORMER PROCESS AND APPARATUS

[75] Inventors: Mahendra L. Joshi, Darien, Ill.; Donald J. Fournier, Jr., Hattiesburg, Miss.; Marvin E. Tester, Waxhaw, N.C.

[73] Assignee: Spectrum Design & Consulting International, Inc., Hattiesburg, Miss.

[21] Appl. No.: 08/924,686

[22] Filed: Sep. 5, 1997

[51] Int. Cl.⁶ .................... C01B 3/24; B01J 8/00; B05B 15/00; C21B 7/08
[52] U.S. Cl. .................... 48/198.1; 48/127.9; 48/64; 239/132.3; 266/197
[58] Field of Search .................... 431/9, 10; 75/497, 75/496; 48/198.1, 127.9; 422/188; 239/132.3; 60/39.06; 266/197

[56] References Cited

U.S. PATENT DOCUMENTS

| | | | |
|---|---|---|---|
| 2,582,938 | 1/1952 | Du Bois Eastman et al. | 48/198.1 |
| 2,621,117 | 3/1952 | Garrison | 48/198.1 |
| 2,836,234 | 5/1958 | Sage | 239/132.3 |
| 2,838,105 | 6/1958 | Du Bois Eastman et al. | 239/132.3 |
| 3,266,552 | 8/1966 | Denis | 239/430 |
| 3,847,564 | 11/1974 | Marion et al. | 48/95 |
| 3,874,592 | 4/1975 | Buschmann et al. | 239/132.3 |
| 4,054,444 | 10/1977 | Clark et al. | 75/496 |
| 4,173,118 | 11/1979 | Kawaguchi | 60/39.65 |
| 4,216,908 | 8/1980 | Sakurai et al. | 239/132.3 |
| 4,556,417 | 12/1985 | Matinez-Vera et al. | 75/496 |
| 4,752,329 | 6/1988 | Freeland et al. | 75/496 |
| 4,902,484 | 2/1990 | Martin et al. | |
| 5,069,029 | 12/1991 | Kuroda et al. | 60/39.06 |
| 5,078,788 | 1/1992 | Bueno C. et al. | |
| 5,158,445 | 10/1992 | Khinkis | 431/10 |
| 5,407,460 | 4/1995 | Bueno C. et al. | 75/489 |
| 5,549,877 | 8/1996 | Gateau et al. | 423/245.3 |
| 5,645,410 | 7/1997 | Brostmeyer | 431/10 |

*Primary Examiner*—Hien Tran
*Assistant Examiner*—James Kennedy
*Attorney, Agent, or Firm*—H. Samuel Kieser

[57] ABSTRACT

A process and apparatus for the production of reformed gases. Natural gas and oxygen are combusted in a first stage to produce carbon dioxide and water. The products of combustion are conveyed to a second stage. Reforming gas and oxygen are injected into the second stage and mixed with the products of combustion to react with the carbon dioxide and water to produce carbon monoxide and hydrogen. The process and apparatus are particularly adapted for use in supplementing the reform gases produced in a Direct Reduced Iron plant wherein iron ore is reduced to iron inside a shaft furnace. The process and apparatus may also be used to provide heated enrichment natural gas for use as a source of carbon in the shaft furnace to provide for carburization of the iron. Additionally, the process and apparatus may be used as a process control device for controlling the temperature of the reformed gases flowing to the shaft furnace.

31 Claims, 6 Drawing Sheets

OXYGEN-FUEL BOOST REFORMER PROCESS AND APPARATUS

BACKGROUND OF THE INVENTION

1. Field of the Invention

This invention relates generally to a process and apparatus for producing reform gases. More particularly, this invention relates to a process and apparatus for producing reform gases to boost the reformed gas capacity of existing reformers.

2. Background

Processes for making reformed gases are widely used throughout the world and have particular application in connection with Direct Reduced Iron (DRI) plants. The DRI plants use reformed gases in large quantities to reduce iron ore (FeO) into iron (Fe) inside a shaft furnace. The iron from the shaft furnace is then processed into various steel grades for fabricating final products such as wires, rods, beams, and the like.

The reformed gases used in such shaft furnaces are mainly a hydrogen ($H_2$) and carbon monoxide (CO) mixture in the general proportion of 1.5:1, respectively. These reforming gases ($H_2$ and CO) provide the following metallization reactions in the shaft furnace:

$$FeO + H_2 \rightarrow Fe + H_2O$$

$$FeO + CO \rightarrow Fe + CO_2$$

The stoichiometric calculations of the above reactions indicate that 400 cubic meters of CO or $H_2$ react with the iron ore (FeO) to form 400 cubic meters of $CO_2$ or $H_2O$ for each metric ton of iron reduced from FeO. Chemical calculations require that the ratio of the reductants (CO+$H_2$) to oxidants ($CO_2$ +$H_2O$) be greater than about 2:1 before any reduction occurs. Therefore, the reformed gas entering the shaft furnace must have a sufficient amount of reductants to allow conversion of 400 cubic meters of reductants into oxidants per ton of iron, and still have a ratio of 2:1 of reductants-to oxidants after all the FeO is reduced to Fe.

The metallization process is carried out in the shaft furnace in which iron oxide is fed from the top in a feed hopper and distributed in the furnace by several distribution legs. The shaft furnace has three zones in which the process is carried out; a reduction zone, a transition zone and a cooling zone. A bustle (larger diameter section), is provided on the furnace which has ports opening into the bottom of the reduction zone through which the bustle gases are injected into the furnace to pass upward through a bed of iron ore in the reduction zone. The bustle gas is mainly the reformed gases ($H_2$ and CO) plus $CO_2$, $H_2O$ and enrichment natural gas. A typical bustle gas composition is as follows:

$CO_2 = 02.5\%$ $CO = 38.0\%$ $H_2 = 56.0\%$ $CH_4 = 02.0\%$ $N_2 = 01.5\%$

The nitrogen is present due to air entering the process at various points, and also due to the fact that the natural gas used in the process may contain up to about 2% nitrogen. The typical bustle gas temperature is around 1650° F. This temperature is achieved after the addition of enrichment natural gas to the reformed gas from the reformer.

The enrichment natural gas is added to provide a source of carbon in the reduction zone. This permits addition of carbon to iron in the reduction zone by the carburization reaction as follows:

$$3Fe + CH_4 \rightarrow Fe_3C + 2H_2$$

This reaction is endothermic and reduces the iron oxide bed temperature. The amount of iron oxide feed, bustle gas temperature, $H_2$/CO ratio and the amount of reformed gas $CO_2$ are largely controlled by the plant operation control loop. The most effective carbon-controlling techniques currently practiced involve adding controlled amounts of natural gas to the bustle gas. Many plants operate at about 2.5% to about 3.5% $CH_4$ in the reducing zone from the bustle gas and about 20.0% to about 50.0% $CH_4$ in the cooling zone. However, the addition of the $CH_4$ as the enrichment gas to the reformed gases entering the bustle tends to reduce the bustle gas temperature making control of the bustle gas temperature more difficult.

The traditional reformed gas-making process for DRI plants is carried out in a reformer where a hydrocarbon feed gas such as natural gas, methane, propane and the like is reacted with $H_2O$ and $CO_2$ (at approximately about 1900° F. to about 2000° F.) in the presence of a catalyst to produce the reductants CO and $H_2$.

The central piece of equipment is a furnace consisting of a refractory-line shell containing catalyst-filled reforming tubes. Fuel is burned in the shell at slightly over atmospheric pressure, while a mixture of natural gas, $H_2O$ and $CO_2$ are passed through tubes containing catalyst pellets made from such material as nickel or alumina nickel. The reforming reactions are characterized by being endothermic (requiring heat input) and by requiring a catalyst to accelerate the reforming reactions. Accordingly, multiple burners are fired in the shell to provide the necessary heat input.

The feed gas (natural gas, methane or propane) is fed to the reforming tubes from an external source while $CO_2$ is provided to the reforming tubes in the form of exiting furnace gas from the shaft furnace. The necessary water ($H_2O$) is added prior to the gaseous mixture entering the reforming tubes. The feed gas and the $H_2O$ and $CO_2$ are mixed and heated in the catalyst-filled reforming tubes to cause the following two reforming reactions to occur in the reforming tubes:

$$CH_4 + CO_2 \rightarrow 2CO + 2H_2,$$

and $$CH_4 + H_2O \rightarrow CO + 3H_2.$$

A typical reformed gas leaving the reformer gas tubes may have a temperature of about 1700° F. and the following composition (on a dry basis): $H_2 = 58.0\%$; $CO = 38.0\%$; $CO_2 = 2.5\%$: $CH_4 = 0.5\%$; and $N_2 = 1.0\%$. The quality of the reformed gas is defined by the reductants ($H_2$ +CO) to oxidants ($CO_2$ +$H_2O$) ratio, the higher being the better. A typical value for the reductants-to-oxidants ratio is about 12 with a $H_2$/CO ratio of 1.5 to 1.

Various factors affect the quality and the reformed gas flow rate. Such factors include the reformer output, reformer tube temperature and reformer burner size. If the reformer output (reformed gas flow rate) is increased beyond the reformer design capacity, the heat load supplied by the reformer burners also increases. As the heat load increases, the catalyst in the center of the reformer tubes gets colder due to the increased heat removal rate through the tubes. The colder catalyst tends to increase the potential of undesirable carbon deposits in the tube, thus reducing the overall reforming performance. Both quality (composition) and flow rate of the reformed gas would be seriously affected due to operating above the designed capacity.

An increase in reformer temperature will also increase the reformer tube temperature. This may set up thermal stresses and possible distortion and damage to the reformer tube material (typically silicon carbide). A damaged reformer tube could cause a complete plant shutdown and loss of production.

The reform burners are sized for a certain firing capacity and flame characteristics. The firing beyond the reformer design capacity would provide an unacceptable temperature profile along the reformer tube length and a potential overheating of the reformer furnace shell refractory. A 2200° F. limit is typical for the reformer. An unacceptable temperature profile along the reformer tube length could affect the catalyst activity and reforming action within the tube, and result in a deterioration of the reformed gas quality. This could result in lower metallization rates by the shaft furnace and/or the production of poor quality reduced iron.

Because of the above, most direct reduction plants are unable to increase their capacity of the reformed gases at will from the reformer beyond the capacity of the reformer. On the other hand, the shaft furnace is generally capable of increased throughput of 20% to 30% of the reduced iron if additional reformed gases could be supplied for the metallization reactions inside the furnace. If a plant desires increased output from its shaft furnace, the options left for the plant are to either install a new bank of reformer tubes and a reformer furnace or purchase the reduced iron from another supplier. Neither of these options are cost-effective. The cost of a new bank of reformer tubes and a reformer furnace requires a capital expense of millions of dollars and such new reformer tubes may not be necessary at all times due to market demand and overall flexibility in the production cycle. The purchase of the reduced iron from another supplier is subject to changing market pricing and availability and also does not present a satisfactory solution to increasing output of the reduced iron.

In view of the above, it is desirable that a relatively low-cost option be provided that would increase the availability of reform gases upon demand to permit an increase in the production of reduced iron when market conditions demand, and which can be cut back to the original capacity of the existing reformer when market conditions dictate a reduced output.

SUMMARY OF THE INVENTION

In view of the above, it is an object of the present invention to provide a simple reform gas producing apparatus and process for producing reform gases.

Another object of the present invention is to provide a reform gas producing apparatus and process for producing reform gas which may be economically used to supplement the output of existing gas reformers.

A further object of the present invention is to provide a reform gas producing apparatus and process for use in direct iron reduction plants to provide supplementary reform gases to supplement the output of the existing reformers.

Yet another object of the present invention is to provide a reform gas producing apparatus and process that can be used, in conjunction with existing gas reformers, to adjust the temperature of the overall reformed gas.

Still another object of the present invention is to provide a reform gas producing apparatus and process for use in direct iron reduction plants to provide supplementary reform gases to supplement the output of the existing reformers, and which can be used to control the temperature of the overall reformed gas.

A still another object of the present invention is to provide a reform gas producing apparatus and process for use in direct iron reduction plants to provide supplementary reform gases to supplement the output of the existing reformers, and which an be used to control the amount of enrichment natural gas being supplied to the iron reduction furnace.

These and other objects and advantages of the present invention may be achieved according to one aspect of the present invention through the provision of a method of generating reform gases to provide additional reform gas capacity. The method comprises combusting a mixture of a first supply of a gaseous hydrocarbon and oxygen in a first stage to provide flame gases; passing said flame gases into a second stage; injecting a second supply of a gaseous hydrocarbon and oxygen into said second stage; and causing said flame gases to react with said second supply of said gaseous hydrocarbon in second stage to produce reformed hydrogen and carbon monoxide.

In accordance with another aspect of the present invention there is provided a gas reformer for generating reform gases comprising a burner for combusting a mixture of a first supply of a gaseous hydrocarbon and oxygen in a first stage to produce combustion products; an elongated mixing tube providing a second stage into which said combustion products are conveyed; and an injector for injecting a mixture of a second supply of a gaseous hydrocarbon and oxygen into said second stage for reaction with the combustion products of said first stage to produce reformed hydrogen and carbon monoxide.

According to another aspect of the present invention there is provided a method for supplementing the amount of reform gas used in direct reduced iron plants wherein primary reformed gas is supplied to a furnace from a primary reformer and passed through the iron ore to produce iron. The method comprises combusting a mixture of a first supply of a gaseous hydrocarbon and oxygen to produce carbon dioxide and water; passing said carbon dioxide and water into a second stage; injecting a second supply of a gaseous hydrocarbon and oxygen into a second stage; causing said carbon dioxide and water to react with said second supply of said gaseous hydrocarbon in said second stage to produce secondary reformed hydrogen and carbon monoxide; and injecting said secondary reformed hydrogen and carbon monoxide into the path of the primary reformed gas to the furnace.

In accordance with yet another aspect of the present invention there is provided a gas reformer for generating supplemental reformed gases in a direct reduced iron plant wherein primary reformed gas is supplied through a path from a primary reformer to a furnace and passed through the iron ore to produce iron. The reformer comprises a burner for combusting a mixture of a first supply of a gaseous hydrocarbon and oxygen in a first stage to produce combustion products; an elongated mixing tube providing a second stage into which said combustion products are conveyed, said mixing tube opening into the path of the reformed gases to said furnace; and an injector for injecting a mixture of a second supply of a gaseous hydrocarbon and oxygen into said second stage for reaction with the combustion products from said first stage to produce reformed hydrogen and carbon monoxide which exit said mixing tube and enter said path of said reformed gases.

DETAILED DESCRIPTION

Figure 1:
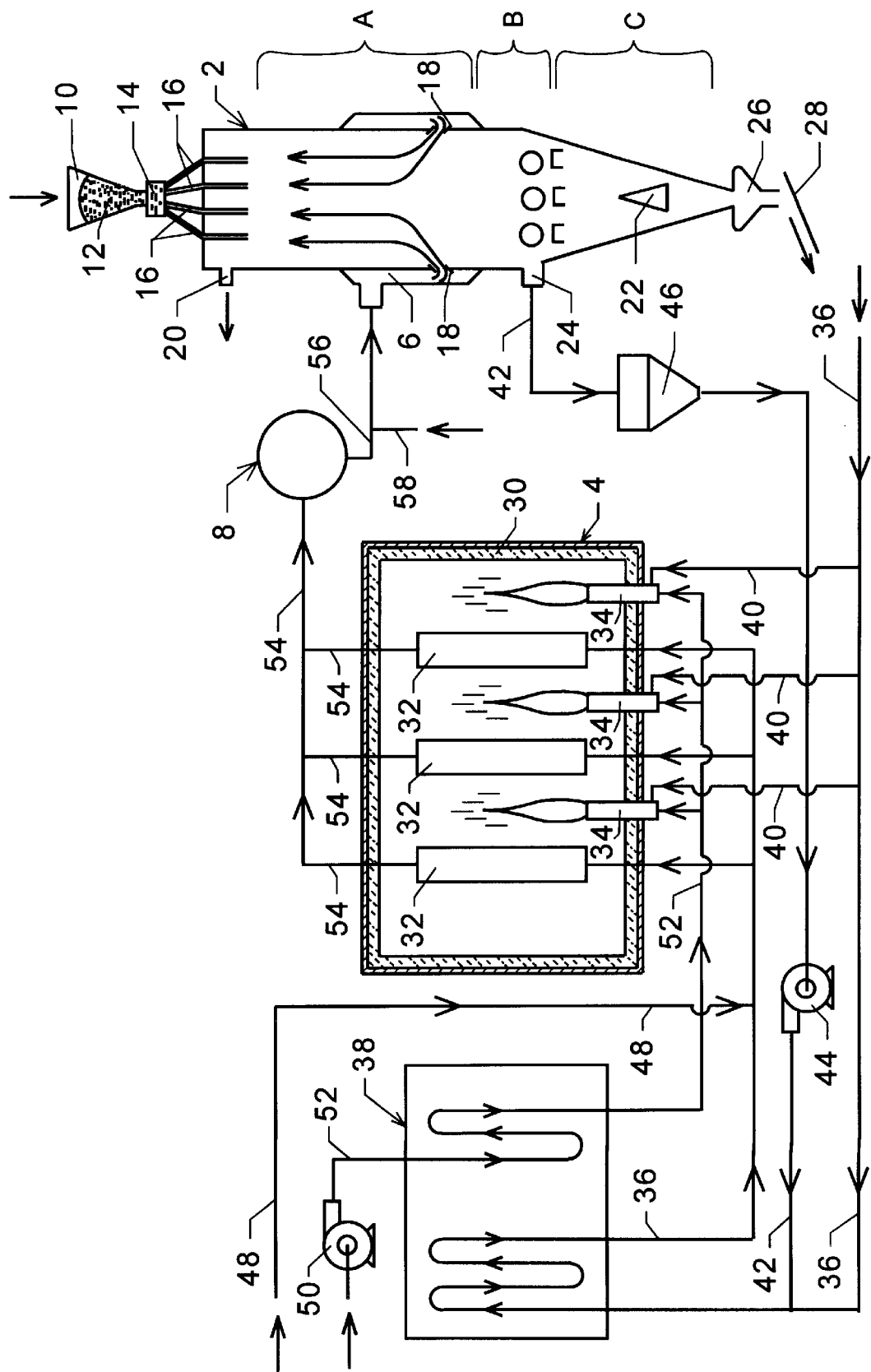
FIG. 1 is a schematic diagram of a typical Direct Reduced Iron plant including a shaft furnace and reformer for the direct reduction of iron utilizing reformed gases.
Figure 2:
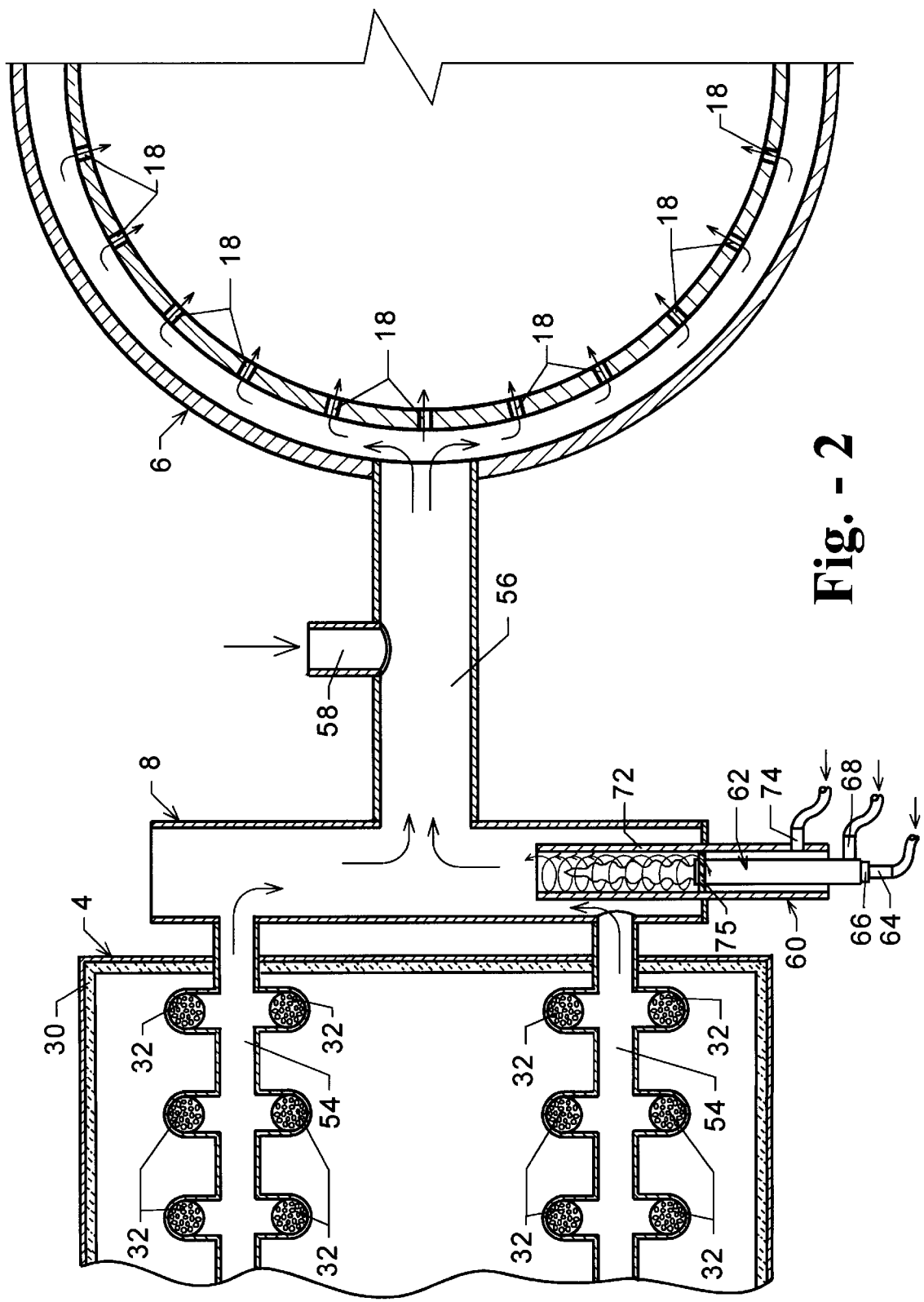
FIG. 2 is a schematic diagram showing the present invention used in connection with the shaft furnace and reformer of FIG. 1.

Referring to the drawings, and particularly FIGS. 1 and 2, there is shown a schematic diagram of a process and apparatus for the direct reduction of metal oxides such as iron ore to which the present invention is particularly applicable. The apparatus and process shown is typical of those commercially used in many Direct Reduced Iron (DRI) plants. The apparatus may include a shaft furnace 2 in which the iron ore (FeO) is reduced to iron (Fe) using reformed gases. The reformed gases are produced in a reformer 4 and are fed to the bustle 6 of the shaft furnace 2 through a header 8.

The shaft furnace 2 may include a feed hopper 10 at its top from which the iron ore 12 is feed into a proportioning hopper 14 from which it is distributed into the furnace 2 by distribution legs 16. The shaft furnace 2 includes three zones; a generally cylindrically shaped reduction zone "A", a transition zone "B" and a cooling zone "C". The bustle 6 of the shaft furnace 2 is an enlarged section at approximately mid-length of the furnace 2 and includes a plurality of ports 18 spaced around its inner circumference and opening into the center of the furnace 2 adjacent the bottom of the reduction zone "A". A top gas outlet port 20 is provided adjacent the top of the furnace 2 through which the top gas exits the furnace 2. Suitable cooling gas inlets 22 are provided for the entrance of cooling gas into the cooling zone "C". Furnace gas outlets 24 are provided adjacent the top of the cooling zone "C" for exit of the furnace gas, primarily carbon dioxide ($CO_2$). A gas seal leg 26 is provided at the bottom of the furnace 2, under which is a vibrating screen 28 to provide for the removal of the cold direct reduced iron.

The reformer 4 is generally a furnace consisting of a refractory lined shell 30 containing rows of catalyst filled reformer tubes 32. Suitable burners 34, extending upwardly in the shell 30 along side the tubes 32, are fired in the shell 30 to provide the necessary heat input.

A feed gas such as natural gas, methane, or other suitable gaseous hydrocarbon, is feed to the reformer tubes 32 through a feed gas line 36 from an external source such as the main plant supply. Generally the feed gas is natural gas which may be 96 to about 98% methane and up to about 2.0% nitrogen. The feed gas flows from its source through the line 36 to a preheater 38. Branch lines 40 from the feed gas line 36 connect with the burners 34 to provide a flow of natural gas to the reformer burners 34. A line 42 from the furnace gas outlets 24 having a pump 44 therein provides for flow of the furnace gas from the furnace 2 through a scrubber 46 to the feed gas line 36 prior to its entering the preheater 38. The feed gas line 36 exits the preheater 38 and is connected to the reformer tubes 32 to provided a flow of feed gas to the tubes 32. A water line 48 is connected to the feed gas line 36 after the preheater 38 and downstream of the tubes 32 to add $H_2O$ to the gas entering the tubes 32. An air blower 50 connected to a line 52 passes through the preheater 38 to the burners 34 to provide preheated air to the burners.

The reformed gases leaving the reforming tubes 32 pass through suitable lines 54 into the header 8 where the reformed gases from the various rows of tubes 32 are collected and then pass through a flow line 56 to the bustle 6 of the shaft furnace 2. A line 58 is connected to the line 56 to the bustle 6 to add an enrichment natural gas to the gas from the header to form the bustle gas entering the bustle 6. The bustle gas passes through the ports in the bustle 6 and passes up though the bed of iron oxide in the reduction zone of the furnace as indicated by the arrows.

In the reformer 4, the mixture of natural gas (or other suitable hydrocarbon such as methane and propane) and $H_2O$ and $CO_2$ is passed through the tubes 32 containing a suitable catalyst such as nickel or an alumina nickel composition and react to produce the reductants CO and $H_2$ according to the following reactions:

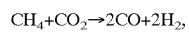

and

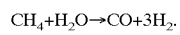

The reformed gas leaving the tubes 52 may typically comprise 58% $H_2$, 38% CO, 0.5% $CH_4$, 2.5% $CO_2$, and 1.0% $N_2$ and have a temperature of about 1650° F. This reformed gas is passed through the line 56, where the enrichment natural gas is added to form the bustle gas, to the bustle 6 of the shaft furnace 2 into the reduction zone "A" of the shaft furnace 2 wherein it passes upwardly through the bed of iron oxide providing the following metallization reactions in the reduction zone:

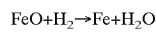

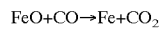

After being reduced, the resulting iron (Fe) passes through the transition zone "B" into the cooling zone "C" of the furnace where the iron is cooled by the cooling gas. The cooling gas is usually natural gas at ambient temperature. After being cooled, the resulting iron is discharged through the gas seal leg 26 onto the vibrating screen 28 and transported away from the furnace.

In accordance with the present invention, an oxygen-fuel boost reformer (OFBR) 60 is provided to produce secondary reform gas to boost the capacity of the standard or primary reformer. (For descriptive purposes, the reformed gas produced by the existing plant reformer 4 is referred to herein as the primary reforming gas, while the reformed gas produced by the process and apparatus of the present invention is referred to as secondary reformed gas.) The oxygen-fuel boost reformer 60 may also be used to supply enrichment natural gas and provide temperature control of the overall reformed gas supply to the shaft furnace 2 as will be explained below.

Figure 3:
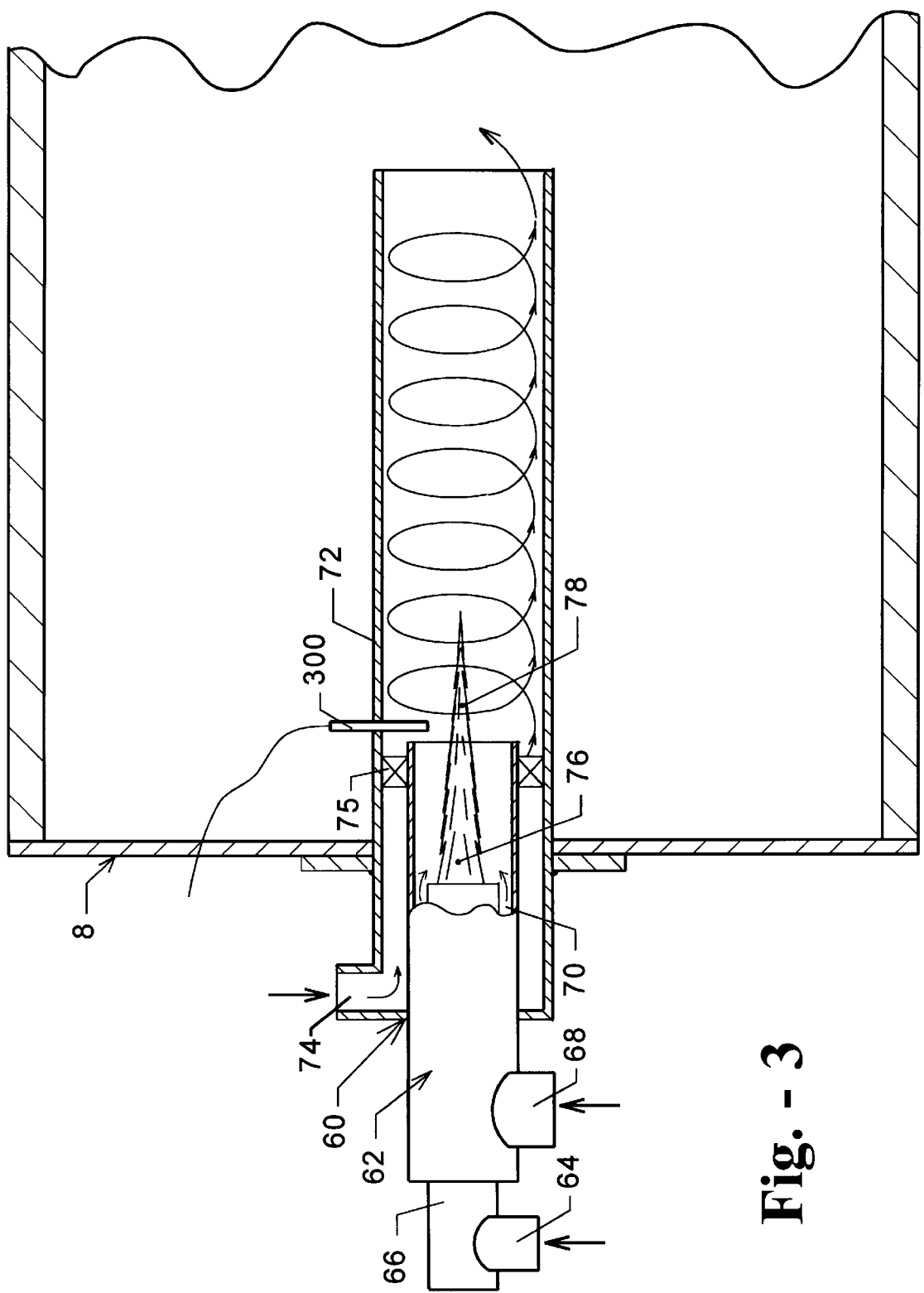
FIG. 3 is a schematic diagram of the oxygen-fuel boost reformer (OFBR) and process according to the present invention.

As shown in FIGS. 2 and 3, the oxygen-fuel boost reformer 60 is mounted down stream of the primary reformer 4 in the reformed gas header 8. However, the oxygen-fuel boost reformer 60 of the present invention may be mounted in other locations as long as such locations provide for the good mixing of the injected secondary reform gases from the oxygen-fuel boost reformer 60 with the primary reformed gas. Such other locations include locating the oxygen-fuel boost reformer 30 in the bustle 6 of the shaft furnace to inject the secondary reform gases directly into the bustle 6, or locating the oxygen-fuel boost reformer 60 in the reformed gas line 56 which conveys the reformed gases from the header 8 to the bustle 6 of the furnace 2.

The oxygen-fuel boost reformer 60 generally comprises a burner 62 in which burner oxygen and burner natural gas are mixed and combusted. An inlet port 64 in the reformer 60 provides an inlet for the natural gas to enter an elongated burner tube 66. An inlet port 68 for the oxygen is provided in the reformer 60 to provide an inlet for oxygen to enter a chamber 70 about the burner tube 66. The oxygen exits the chamber 70 and mixes with the natural gas and the mixture combusted, with the products of combustion flowing into a mixing tube 72.

The reformer 60 also includes an inlet port 74 (or ports) for the entrance of the reforming natural gas and oxygen into the elongated mixing tube 72, preferably through a swirler 75, at a point down stream of the combustion point of the burner gases. The reforming natural gas and oxygen mix with the products of combustion of the burner natural gas and oxygen in the elongated mixing tube 72 to produce the reforming reactions in the mixing tube 72.

The oxygen-fuel boost reformer 60 of the present invention provides a two stage process for providing the reform gases. A first stage 76 (stage I) provided in which near stoichiometric proportions of burner natural gas and burner oxygen are mixed and combusted creating a stable oxy-fuel flame. The combustion of the natural gas and oxygen produces the following stage I stoichiometric reaction:

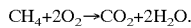

$$CH_4 + 2O_2 \rightarrow CO_2 + 2H_2O.$$

The flame gases from the combustion are conveyed into a second mixing stage 78 (stage II), within the elongated mixing tube 72, into which a predetermined quantity of reforming natural gas and oxygen are injected, preferably in a swirl configuration to provide the following stage II reactions:

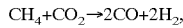

$$CH_4 + CO_2 \rightarrow 2CO + 2H_2,$$

and

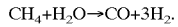

$$CH_4 + H_2O \rightarrow CO + 3H_2.$$

The resulting gases from the oxygen-fuel boost reformer are CO, $H_2$, $H_2O$, $CH_4$ and $CO_2$. The $CH_4$ in the resulting gases is present as enrichment natural gas arising due to additional amounts of reforming natural gas being supplied to stage II over that which is necessary for, and consumed in, the reaction occurring in stage II.

Although the oxygen-fuel boost reformer and process of the present invention is described as being supplied with natural gas and oxygen for both stage I and stage II, it is contemplated that various gaseous hydrocarbons may be used such as natural gas, propane, methane and the like, and the source of oxygen may be commercial grade oxygen, air, or mixtures thereof.

Figure 4:
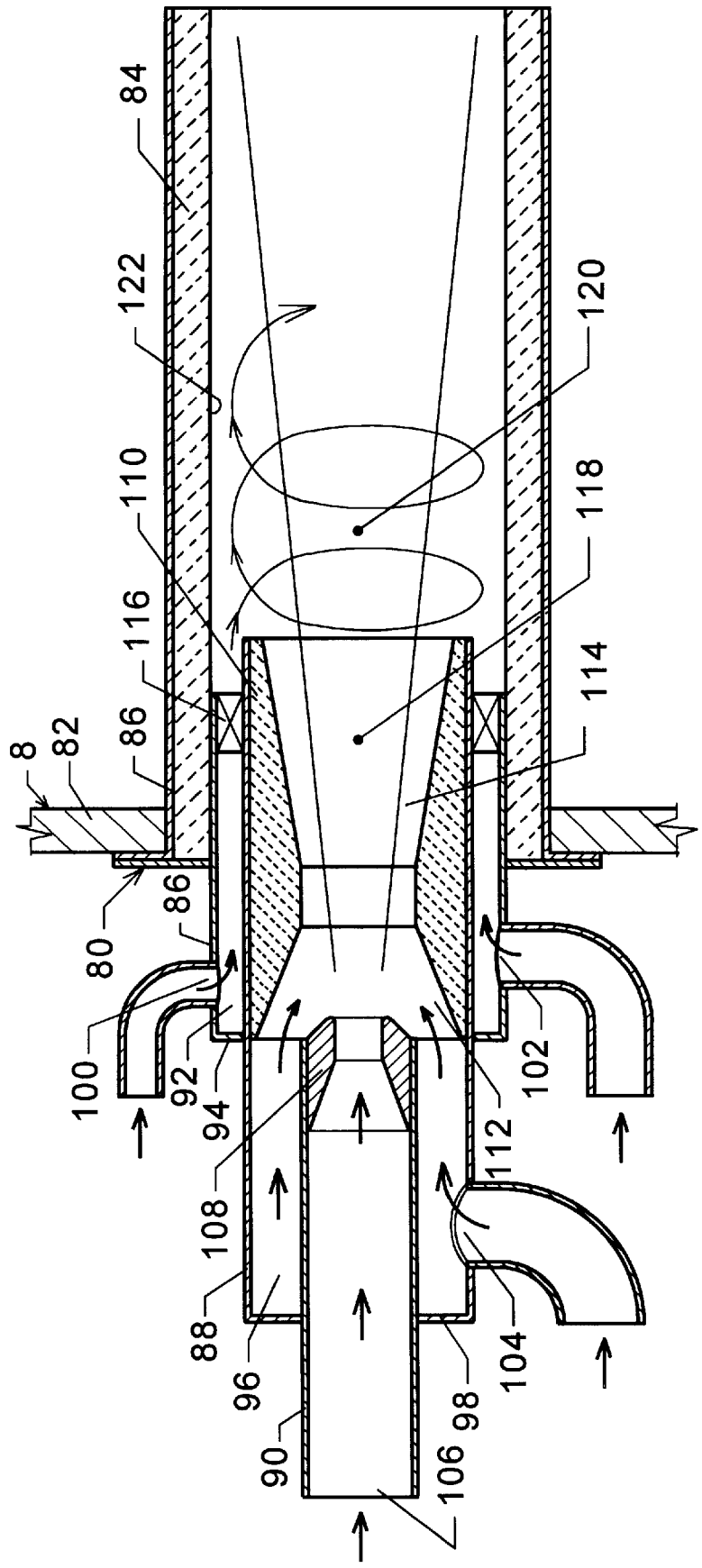
FIG. 4 is a cross-sectional view of one embodiment of an oxygen-fuel boost reformer incorporating the present invention, showing the reformer installed in a reformed gas header.
Figure 5:
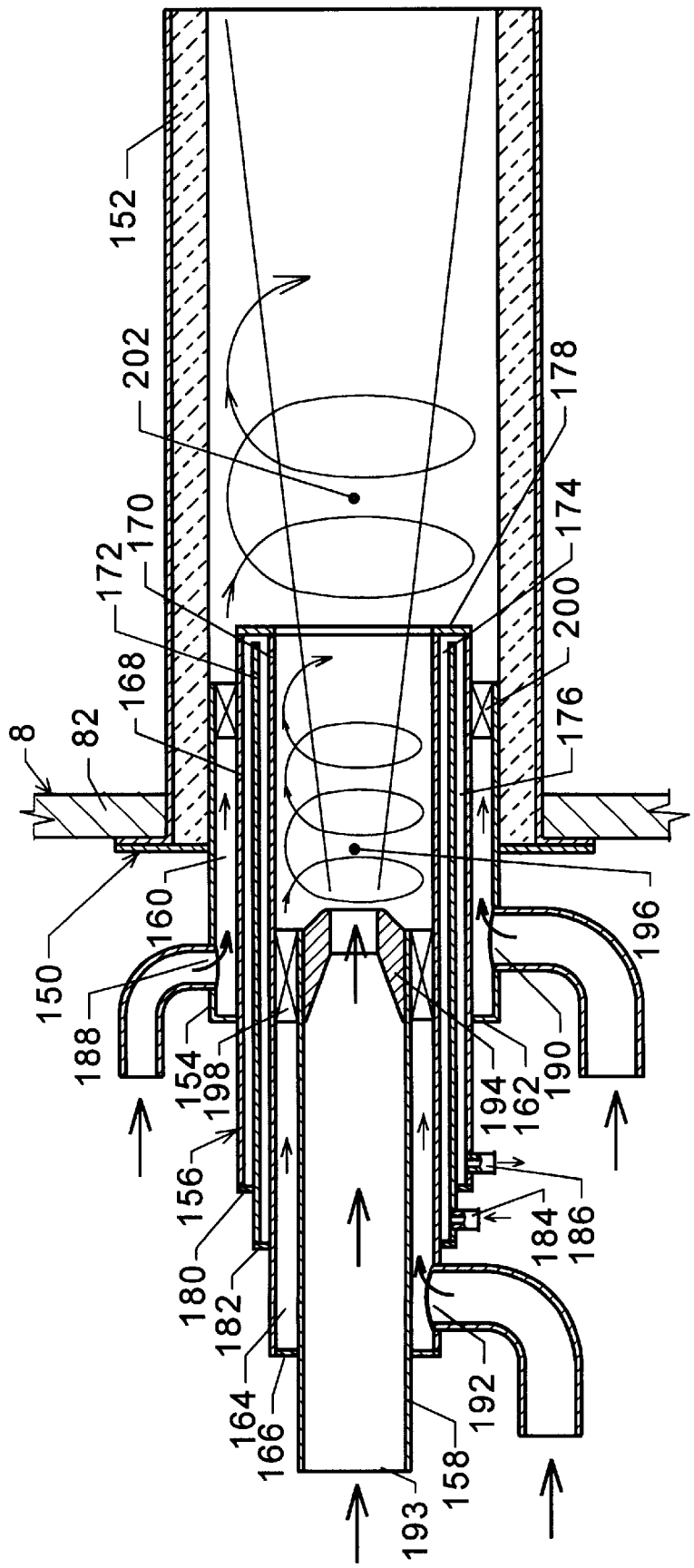
FIG. 5 is a cross-sectional view of a second embodiment of an oxygen-fuel boost reformer in accordance with the present invention, showing the reformer mounted in a reformed gas header.
Figure 6:
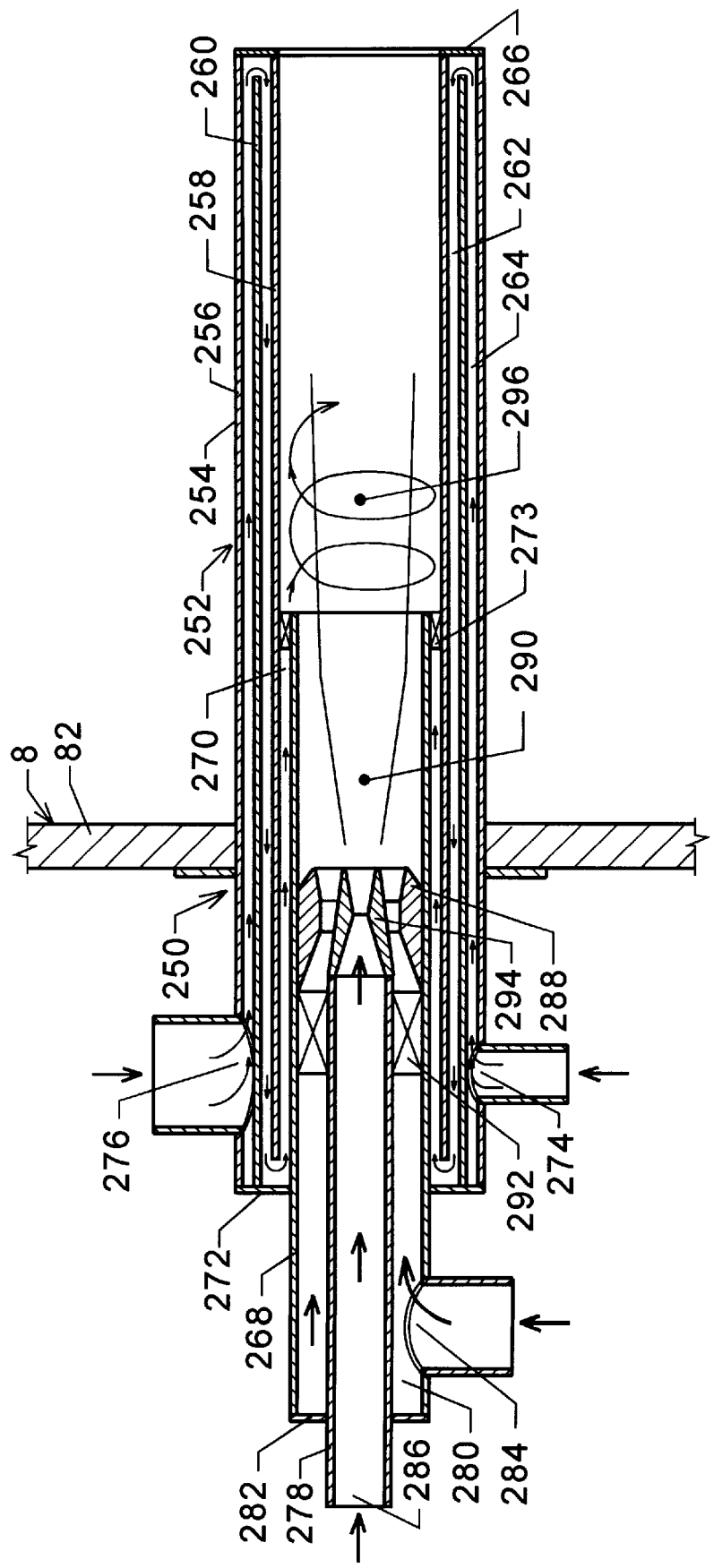
FIG. 6 is a cross sectional view of a third embodiment of an oxygen-fuel boost reformer in accordance with the present invention, showing the reformer mounted in a reformed gas header.

FIGS. 4–6 show various embodiments of an oxygen-fuel boost reformer that may be used to carry out the oxygen-fuel boost reformer process. As shown in FIG. 4, an oxygen-fuel boost reformer 80 is mounted in the end wall 82 of the primary reformed gas header 8, and includes a refractory lined mixing tube 84 attached to and extending through the reformed gas header wall 82 into the interior of the header 8. An outer tube 86 is mounted in the rearward end of the mixing tube and surrounds an elongated intermediate tube 88 which is radially spaced therefrom and is coaxial therewith. An inner tube 90 is provided within the intermediate tube 88 and is spaced radially inward therefrom and coaxial therewith.

The outer tube 86 forms an annular chamber 92 around the intermediate tube 88 which is closed at its outer end by a suitable closure 94. The intermediate tube 88 extends axially rearward out from the end of the outer tube 86 and forms a annular chamber 96 with the inner tube 90 which is closed at its outer end by a suitable closure 98.

The outer tube 86 is provided with a first port 100 communicating with the chamber 92 for connection to a source of reforming oxygen. A second port 102 in the outer tube 86, communicating with the chamber 92, provides a means for connecting a source of reforming natural gas with the chamber 92. Alternatively, the natural gas and oxygen may be mixed together and enter the chamber through a single port.

A port 104 is provided in the intermediate tube 88, axially rearward of the outer tube 86, communicating with the chamber 96 for connecting a source of burner oxygen to the chamber 96. The inner tube 90 has a port 106 at its outer end, communicating with the interior thereof, for attachment to a source of natural gas.

A nozzle 108 of high temperature alloy steel such as SS-310, Inconel, Hastealloy or the like, is provided at the forward end of the inner tube 90 as shown. A venturi 110, made of refractory material, is mounted in the intermediate tube 88, axially forward of the forward inner end of the inner tube 90, and is so positioned that the throat 112 of the venturi 110 is spaced forwardly inwardly of the forward end of the nozzle 108 of the inner tube 90 and the divergent section 114 of the venturi 110 opens into the mixing tube 84. A swirler 116 is mounted between the outer tube 86 and the intermediate tube 88 as shown, with the venturi 110 extending axially forward within the mixing tube 84 a slight distance beyond the swirler 116. The swirler 116 may be in the form of angled blades or vanes positioned about the circumference of the forward end of the chamber 92 between the outer tube 86 and the intermediate tube 88. The swirler 116 is preferably made from alloy steel and is in the from of helical guide vanes. The vanes may have a swirl angle with respect to the flow axis of between 30 and 60 degrees. Four to six blades are generally sufficient depending upon the size of the oxygen-fuel boost reformer 80.

With the embodiment of FIG. 4, natural gas is fed through port 106 to the inner tube 90 and flows through the nozzle 108 into the throat 112 of the venturi 110. Oxygen is fed through port 104 into the chamber 96 between inner tube 90 and intermediate tube 88 and then flows into the throat 112 of the venturi 110. The exit area of the nozzle 108 and the passage area at the end of the chamber 96 are chosen so that there is a relatively high injection velocity of between about 220 to about 800 feet per second of the burner gas and burner oxygen into the throat 112 of the venturi 110.

The burner oxygen and burner natural gas impinge upon each other in the throat 112 of the venturi 110 resulting in good mixing conditions. The divergent section 114 of the venturi 110 preferably has a length about 2 to about 6 times the minimum diameter of the throat 112, and provides for the mixing of the oxygen and natural gas and formation of the oxy-fuel flame in the stage I area 118. The flame is initially formed by the ignition of the oxygen-natural gas mixture in the stage I area 118 in the divergent section 114 of the venturi 110 by the heat from, and the physical mixing with, the surrounding primary reformed gas in the header surrounding the outside of the mixing tube 84. These primary reformed gases typically have a temperature in the range of from about 1600° F. to about 1700° F. A flame of very little visible radiation is preferred for this stage I operation wherein the natural gas and oxygen stoichiometricly react to form water and carbon dioxide. In the embodiment of FIG. 4, the venturi 110 is preferably made from a refractory material due to the high-temperature oxy-fuel flame. A water-cooled venturi mixer should be used for higher firing capacities (greater than 2 MM Btu/Hr.). At such higher firing capacities, the natural gas nozzle 108 may be provided with multiple axial holes to improve mixing with the surrounding oxygen stream.

Natural gas, or other gaseous hydrocarbon, and oxygen are fed through their respective ports 102 and 100 to the chamber 92 in the correct proportion. The oxygen and natural gas exit the chamber 92 through the gas swirler 116 into the mixing tube 84 in the stage II area 120 forward of the forward end of the venturi 110. The swirler 116 provides two functions. First, it should provide sufficient swirling motion to the natural gas-oxygen mixture to create fast mixing with the Stage I combustion products which exit the venturi 110 into the stage II area 120. Second, it should scrub the internal surface 122 of the mixing tube 84 to provide cooling which is necessary due to the thermal radiation from the high temperature stage I combustion products.

The stage I area 118 mixing and combustion occurs substantially in the divergent section 114 of the venturi 110. The Stage II area 120 mixing and reaction begins to occur within the mixing tube 84 immediately downstream of the forward end of the venturi 110. As previously stated, the combustion gases from Stage I react with the natural gas-oxygen mixture in stage II to form the secondary reformed gases carbon monoxide and hydrogen. These gases pass out of the mixing tube 84 into the reformed gas header 8 and supplement the primary reformed gases passing to the shaft furnace 2.

FIG. 5 shows a second embodiment of an oxygen-fuel boost reformer 150 embodying the present invention. As in the previous embodiment, the reformer 150 is shown mounted in the wall 82 of the primary reformed gas header 8. The reformer 150 includes a refractory lined mixing tube 152 attached to and extending through the reformed gas header wall 82 into the header 8. An outer tube 154 is mounted in the rearward end of the mixing tube 152 and surrounds an elongated cooling jacket 156 which is radially spaced inwardly from the mixing tube 152 and is coaxial therewith. An inner tube 158 is provided within the cooling jacket 156 and is spaced radially inward therefrom and coaxial therewith.

The outer tube 154 forms an annular chamber 160 around the cooling jacket 156 which is closed at is rearward end by a suitable closure 162. The cooling jacket 156 extends axially rearward from the end of the outer tube 154 and forms a chamber 164 with the inner tube 158 which is closed at its rearward end by a suitable closure 166.

The cooling jacket 156 may be formed by an outer cooling jacket tube 160 coaxial with the outer tube 154 and spaced radially inward from the outer tube 154 to form the annular chamber 160 therewith. The outer cooling jacket tube 168 extends into the mixing tube 152 beyond the forward end of the outer tube 154 as shown. An inner cooling jacket tube 170, of smaller diameter than the outer cooling jacket tube 168, is provided within the outer cooling jacket tube 168 and is coaxial therewith to provide an annular space therebetween. An intermediate cooling jacket tube 172 is interposed between the inner and outer cooling jacket tubes 170 and 168 to provide inner and outer longitudinally extending annular passageways 174 and 176, respectively. The forward ends of the inner and outer cooling jacket tubes 170 and 168 are interconnected by a closure member 178. The intermediate cooling jacket tube 172 is spaced axially rearward from the closure member 178 so that there is communication between the inner and outer annular passageways 174 and 176 at the forward end of the cooling jacket 156. The outer passageway 176 is closed at its rearward end by a closure member 180 extending radially from the rearward end of the outer cooling jacket tube 168 to the wall of the intermediate water jacket tube 172. The rearward end of the inner passageway 174 is closed by a closure member 182 extending between the rearward end of the intermediate cooling jacket tube 172 and the inner cooling jacket tube 170.

A cooling fluid inlet port 184, communicating with the inner passageway 174, is provided in the wall of the intermediate cooling jacket tube 172 adjacent the rearward end thereof and positioned rearward from the closure member 180 of the outer passageway 176. A cooling fluid outlet port 186 is provided in the wall of the outer cooling jacket tube 168, adjacent the outer end thereof and communicating with the outer passageway 176. With this arrangement, cooling fluid, such as water, may enter the inner passageway 174 through the port 184 adjacent the rearward end of the passageway 174, flow forward along the inner passageway 174, around the forward end of the intermediate cooling jacket tube 172 and rearward through the outer passageway 176 to the outlet port 186 where it exits the cooling jacket 156.

The outer tube 154 is provided with a first port 188 communicating with the chamber 160 for connection to a source of reforming oxygen. A second port 190 in the outer tube 154 also communicating with the chamber 160, provides a means for connecting of a source of reforming natural gas to the chamber 160. Alternatively, the natural gas and oxygen may be mixed together and enter the chamber through a single port.

A port 192 is provided in the wall of the inner water jacket tube 170, axially rearward of the end of the intermediate water jacket tube 172, communicating with the chamber 164, for connecting a source of burner oxygen with the chamber 164. The inner tube 158 has a port 193 at its outer end, communicating with the interior thereof, for attachment to a source of natural gas.

The forward end of the inner tube 158 terminates at a point spaced rearward from the forward end of the inner cooling jacket tube 170 of the cooling jacket 156 as shown. A nozzle 194 is provided at the forward inner end of the inner tube 158 which opens into the Stage I mixing area 196 which is surrounded by the water jacket 156. A swirler 198, similar to the swirler described in connection with the embodiment shown in FIG. 4, is mounted between the inner tube 158 and the inner cooling jacket tube 170 at the forward inner end of the chamber 164 as shown. A swirler 200 is also provided at the forward end of the chamber 160 extending about the outer cooling jacket tube 168.

With the arrangement of the reformer 150 as shown in FIG. 5, burner oxygen flows through the port 192 into the chamber 160, and exits the chamber 160 through the swirler 198 into the stage I area 196 with a swirling motion. Natural gas flows into the inner tube 158 through the port 193 and passes through the nozzle 194 into the stage I mixing area 196 and mixes with the swirling oxygen. The natural gas injection rate may be between about 220 to about 800 feet per second. The heat from the primary reduced gases in the header.8 ignites the oxygen fuel mixture in the stage I area 196 at a point immediately forward of the nozzle 194 creating a high-temperature oxy-fuel flame inside the cooling jacket 156. The natural gas and oxygen stoichiometricly react to form water and carbon dioxide in Stage I.

A reforming natural gas passes through the port 190 into the chamber 160 and mixes with the reforming oxygen entering the chamber 160 through the port 188. As in the previous embodiment, the reforming natural gas and oxygen may be mixed prior to entering the chamber. The mixture of reforming natural gas and oxygen passes through the outer swirler 200 into the mixing tube 152 at a point immediately downstream of the end of the water jacket 156 in the stage II mixing area 202. At his point the stage II mixing and reaction begins to occur within the mixing tube 152. As mentioned above, the combustion gases from Stage I react with the natural gas-oxygen mixture in stage II to form the secondary reformed gases carbon dioxide and hydrogen. These gases pass out of the mixing tube 152 into the reformed gas header 8 and supplement the primary reformed gases passing to the shaft furnace.

The water cooled combustion chamber (stage I) provides for higher firing capacity of the stage I mixer (the burner natural gas and burner oxygen). It also provides flame stability to operate the stage I mixer at a relatively higher flame gas temperature.

A third embodiment of an oxygen-fuel boost reformer 250 embodying the principles present invention is shown in FIG. 6. As in the case of previous embodiments, the reformer 250 is shown mounted in the end wall 82 of the primary reformed gas header 8 of an existing DRI plant. In this embodiment, the reforming natural gas and oxygen are preheated before entering the stage II. A mixing tube 252 is attached to and extends through the reformed gas header wall 82 into the header 6. The mixing tube 252 is constructed to constitute a preheater 254 for the reforming gases. The mixing tube 252 includes a preheater outer tube 256 which extends through the wall 82 of the header 8. The preheater outer tube 256 surrounds an inner preheater tube 258 which is of a smaller diameter than the outer preheater tube 256 and is coaxial therewith. An intermediate preheater tube 260 is interposed between the inner and outer preheater tubes 258 and 256 to provide inner and outer longitudinally extending annular passageways 262 and 264 respectively. The forward ends of the inner and outer preheater tubes 258 and 256 are interconnected by a closure member 266. The intermediate preheater tube 260 has its inner end spaced rearward from the closure member 266 so there is communication between the inner and outer passageways 262 and 264 at the forward end of the preheater 254. The tubes 256, 258 and 260 forming the preheater 254 are preferably constructed from a high temperature alloy steel such as SS-310, Inconel, Hastealloy and the like.

A stage I tube 268 of a smaller diameter than the inner preheater tube 258 extends into the inner preheater tube 258 coaxially therewith providing an annular outlet passageway 270 for the preheater 254 between its outer wall and the inner wall of the inner preheater tube 258. A closure member 272 extends from the rearward end of the outer preheater tube 256 to the outer wall of the stage I tube 268, with the rearward end of the intermediate preheater tube 260 being connected thereto so that the rearward end of the outer passageway 264 is closed. The rearward end of the inner preheater tube 258 is spaced from the closure member 272 so that the inner passageway 262 and outlet passageway 270 are interconnected. A swirler 273 may be provided at the forward end of the outlet passageway 270

A first port 274 is provided in the outer preheater tube 256, communicating with the outer preheater passageway 264, for connecting source of reforming oxygen with the outer passageway 264. A second port 276 in the outer preheater tube 256 provides a means for connecting a source of reforming natural gas with the outer passageway 264. Alternatively, the natural gas and oxygen may be mixed together and enter the outer passageway 264 through a single port.

An inner burner tube 278 extends coaxially into the stage I tube 268 and is of a smaller diameter than the stage I tube 268 to provide a chamber 280 between the stage I tube 268 and the inner burner tube 278. A closure member 282, extending between the rearward end of the stage I tube 268 and the outer wall of the burner tube 278 closes the rearward end of the chamber 280.

A port 284 is provided in the wall of the stage I tube 268, axially rearward of the closure member 272, communicating with the chamber 280, for connecting a source of burner oxygen to the chamber 280. The inner burner tube 278 has a port 286 at its outer end, communicating with the interior thereof, for attachment to a source of natural gas.

A nozzle 288 is provided in the stage I tube 268, intermediate its length, and at the forward end of the chamber 280. The nozzle is preferably designed for providing an oxygen velocity in the range of about 200 to about 400 feet per second into the stage I mixing area 290 within the forward portion of the stage I tube 268. A swirler 292 is provided at the forward end of the chamber 280, immediately to the rear of the nozzle 288, to impart a swirling action to the oxygen entering the stage I area 290. The swirler 292 may utilize helical vanes having a 10° to 45° angle with the longitudinal axis.

A nozzle 294 is provided at the forward end of the burner tube 278, terminating at its forward end substantially co-planar with the forward end of the oxygen nozzle 288. The nozzle 292 is preferably designed to provide an natural gas injection velocity in the range of about 200 to about 800 feet per second into the stage I area 290.

With the arrangement of the embodiment shown in FIG. 6, the burner natural gas passes through the port 286 into the burner tube 278, and exits the burner tube 278 through the nozzle 294 into the stage I area 290. The burner oxygen enters the chamber 280 through the port 284 and passes through the swirler 292 and nozzle 288 into the stage I area within the forward portion of the stage I tube 268. The oxygen is slightly swirled by the swirler 292 as it enters the stage I area, and mixes with the natural gas in the stage I area. The oxygen-natural gas mixture is ignited by the heat of the existing reforming gases in the header 8 to create a stable oxy-fuel flame in the stage I area.

The reforming natural gas and oxygen enter the preheater 256 through their respective ports 274 and 276 and pass forwardly though the outer passageway 264, recirculate rearward though the inner passageway 262, and reverse direction again and pass forwardly though the passageway 270 into the stage II mixing area 296 immediately forward of the forward end of the stage I tube 268. In the stage II area, the products of the stage I combustion (mainly $CO_2$ and $H_2O$) are mixed with the preheated natural gas and oxygen to initiate the reforming reaction to form the secondary reformed gases which then exit the forward end of the mixing tube 252 into the header 8.

In the embodiment of FIG. 6, the reforming natural gas and oxygen are preheated before they enter the stage II area 296 to improve the reforming efficiency. As noted in the drawings, the preheater mixing tube 254 extends into the header so that a substantial portion of the external surface of the preheater is exposed to the hot reformed gases to recover heat therefrom. The mixing tube length to diameter ratio (L/D) is maintained in the range of about 3 to about 9 depending upon the availability of space inside the reformed gas header or other location such as the bustle of the shaft furnace to provide for sufficient residence time of the gases in stage II to complete the reaction.

The overall process of the present invention is divided into two stages, stage I and stage II. In the stage I mixing and combustion process, a predetermined quantity of burner oxygen and burner natural gas in near stoichiometric proportion (2:1) are mixed and combusted using a first stage mixer. Here a stable oxy-fuel flame is created by a nozzle arrangement. The flame gases are then conveyed into a mixing tube of a predetermined length and diameter. The stage II mixing and reactions take place in the mixing tube which is well extended into the primary reforming gas header.

The stoichiometric mixture of oxygen and natural gas in the stage I area is initially ignited by contacting hot primary reform gases in the header. The header reform gases are generally at 1700° F. and 15 psig. By using a flame sensing device 300 (see FIG. 3) such as an ultraviolet sensor, flame rod or thermocouple, it can be verified that a good stable flame extends into and is maintained in the mixing tube. The oxy-fuel flame combustion products are mainly $CO_2$ (33.3%) and $H_2O$ (66.6%) by volume and the peak temperatures of the flame products are in the range of 4000° F. to 4500° F. The mixing tube material of the embodiments of FIGS. 4 and 5 (refractory-lined steel, stainless steel or Inconel) is not designed for handling temperatures in this range for long durations. Therefore, it is necessary that the stage II mixing and reactions begin as soon as possible In the stage II mixing and reaction process, a predetermined quantity of reforming natural gas and oxygen are introduced into the stage II in a swirl configuration. In stage II, a small amount of oxygen is mixed with the reforming natural gas as a catalyst to initiate the reforming reactions within the mixing tube. The swirling action of the injection of the natural gas and oxygen into the stage II area serves two functions. First, the swirling mixture provides cooling of the mixing tube internal surface and protects the refractory lined mixing tube from thermal damage, Second, the stage II reaction, utilizing the stage I combustion products, $CO_2$ and $H_2O$, which are at much higher temperatures, will react more quickly with the reforming gases $CH_4$ and $O_2$ to produce the reformed gases ($H_2$ and CO), as well as preheated methane ($CH_4$).

The length to diameter (L/D) ratio of the stage II length of the mixing tube is selected for the reforming reaction residence time. The mixing tube acts as an isolation tube to prevent premature mixing of the stage I combustion products and stage II reforming gases with the outside gases in the header, resulting in substantially all the reforming oxygen being reacted within the mixing tube. A L/D ratio of 3 to 9 is generally sufficient for good mixing between the stage I products and the stage II reforming gases.

Some of the methane in the natural gas provided for the reaction in stage II is not reformed. This gas becomes enrichment gas for the shaft furnace. The provision of enrichment natural gas in the second stage permits effective control of the temperature and carbon content of the overall reformed gas mixture going to the bustle of the shaft furnace, thereby providing control by the reformer of the present invention of the carburizing reaction in the reduction zone of the shaft furnace. By varying the amount of excess natural gas being supplied to the Stage II, the amount of enrichment natural gas present in the overall reformed gas supply (primary and secondary) may be varied.

The composition of the gas produced by the oxygen-fuel boost reformer of the present invention is very similar to the reformer produced gases in both reductant-to-oxidant ($H_2$+ $CO/H_2O+CO_2$) ratio and the $H_2/CO$ ratio. Thus similar quality reformed gases are generated by the apparatus and process of the present invention with the additional benefit of having preheated methane (3% to 4% by volume as enrichment natural gas) in the overall reformed gas composition. The process and apparatus of the present invention thus minimizes the need for the injection of cold enrichment methane (natural gas) in the reformed gas before the bustle. Further, the provision of excess natural gas in the stage II mixing also allows a good control over the overall reforming gas temperature as well as providing a cooling medium for the mixing tube material.

Table I below sets forth an example of the relative process gas flow rates and direct reduced iron (DRI) production rates for a typical DRI production plant using primary reformed gas from the plant reformer. The table also sets forth simple estimates on the amount of additional reformed gas needed to be produced by the oxygen-fuel boost reformer (OFBR) of the present invention for the overall effect of increasing the DRI production rate. The values in Table I are estimated for a 5 tons/per hour increase in production (or the metallization rate) by a shaft furnace running at 70 tons/hour. The flow rates used for the gases in Table I are given in standard cubic feet per hour (scfh).

TABLE I

| Options | DRI Prod. Rate (tons/Hr) | Total Reformed Gas Required | OFBR Natural Gas (scfh) | OFBR Oxygen (scfh) | OFBR Reformed Gases (scfh) | OFBR Gases as % of Total Gases |
|---|---|---|---|---|---|---|
| Current | 70 | 4,200,000 | | | | |
| With OFBR | 75 | 4,404,000 | 68,000 | 34,000 | 204,000 | 5.0 |

For simplicity, the amount of OFBR reformed gas in Table I has been computed using the following chemical reaction:

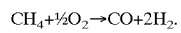

This is a simplistic (and global) representation of the combined stage I and stage II reactions of the process described herein. As may be seen by this reaction equation, one volume of reactants produces 2 volumes of reformed gases.

The OFBR process is a two stage process wherein the total natural gas and total oxygen are combusted in stagewise fashion and not all together as indicated by the above chemical equation. Table I assumes that the current (existing) reformed gas composition (dry volume) is $H_2$=58%, CO=38%, $CO_2$=2.5%, $CH_4$=0.5%, and $N_2$=1.0%. Further it is also assumed that the OFBR reforming process is 100% efficient and that all the reforming natural gas and oxygen are converted into CO and $H_2$. It is to be understood that the real process is not 100% efficient and may vary between about 50 to about 90% reforming efficiency.

Table II below sets forth the preferred ranges and percentages of the natural gas and oxygen flow rates of Stage I and Stage II operation of the oxygen-fuel boost reformer process. The flow rates are given as guidelines and can vary significantly from one DRI plant to another depending upon temperature, pressure and composition of the primary reform gases in the plant and the overall operation of the plant. For the purpose of Table II, it is assumed that a 5 ton/hour increase in DRI production is desired and the basic process requirement of Table I is in effect.

diameter ratio is used, then the products of the stage II reaction will contain very little unused $CO_2$ and/or $H_2O$. The higher $CO_2$ and $H_2O$ temperature in Stage II is beneficial in increasing reaction rates and production of CO and $H_2$. The injection of enrichment natural gas into Stage II is beneficial for improvement of the mixing and utilization of $H_2O$ and $CO_2$ for the reforming actions, the reduction of Stage I temperature for mixing tube material capability, and the preheating of the enrichment natural gas utilizing Stage I thermal energy.

A good temperature window for the Stage II mixing and reforming is between about 1800° F. and about 3500° F. The output from stage II consists of the reformed gases (CO+

TABLE II

| STAGE I | | | | STAGE II | | | | |
| --- | --- | --- | --- | --- | --- | --- | --- | --- |
| Burner Oxygen ($BO_2$) (scfh) | Burner Nat. Gas (BNG) (scfh) | $BO_2$ (%) of Total Oxygen | BNG (%) of Total Nat. Gas | Reforming Nat. Gas (RNG) (scfh) | RNG (%) of Total Nat. Gas | Reforming Oxygen ($RO_2$) (scfh) | $RO_2$ (%) of Total Oxygen | OFBR Reformed Gas (scfh) |
| 27,000 | 17,000 | 65–95 | 10–40 | 51,000 | 60–90 | 7,000 | 5–35 | 204,000 |

Using Table II as a reference, one example of the operation of the process and apparatus of the present invention is to set the burner firing in Stage I at about 25% of the total natural gas used by the oxygen-fuel boost reformer system and the burner oxygen is set at near stoichiometric proportion. The reforming natural gas is set at 75% of the total natural gas used in the process. Reforming oxygen is set at 20% of the of the total oxygen used by the system. The reformed gases produced by the OFBR system indicated in Tables I and II are set at 5% of the total reformed gas volume. Enrichment natural gas is not shown in Table II, but, for example, can be set at 25,500 standard cubic feet per hour (scfh), about half compared to the reforming natural gas. The enrichment natural gas flow rate may be varied by the plant operator to control the overall reformed gas temperature and carbon content for the DRI process.

Depending upon the Stage I mixer (burner) design, the peak temperatures of the Stage I oxygen-natural gas products of combustion (33% $CO_2$ and 66.6% $H_2O$) are relatively high and can vary anywhere from about 3500° F. to about 4500° F. The variance is due to the design of the stage I mixer. If the oxygen-natural gas mixing is perfect, an adiabatic (theoretical maximum) flame gas temperature is obtained. If a nozzle-mix burner is used, a relatively cooler flame gas temperature of about 3500° F. to about 4000° F. is obtained. The mixing process and the stage I mixer should be carefully selected based on the downstream mixing tube material of construction. A refractory-lined mixing tube can allow higher peak flame gas temperatures, whereas an alloy steel mixing tube will require the relatively lower temperatures of a nozzle-mix oxygen-fuel burner for the stage I mixing.

In stage II, the reforming natural gas and oxygen are injected in a swirling motion around the stage I products of combustion. The basic reforming reactions for Stage II are the following:

$$CH_4+CO_2 \rightarrow 2CO+2H_2$$

and $$CH_4+H_2O \rightarrow CO+3H_2.$$

If proper mixing of the reformed gases is achieved as by the use of a swirler and a mixing tube with the proper length to $H_2$), preheated natural gas, and leftover or unreacted $CO_2$ and $H_2O$. By considering Table I and Table II for OBFR flows, at an estimated Stage I peak flame gas temperature of 3500° F., the stage II equilibrium temperature is estimated at about 2300° F. The final equilibrium temperature of all the reformed gases in the header, after mixing with the OFBR reformed gases, is estimated at 1680° F. This is a 30° F. increase in temperature due to the OBFR process.

The oxygen-fuel boost reformer and process of the present invention provides a means for controlling the total amount of the reformed gases being supplied, the temperature of the overall (primary and secondary) reformed gases, and the amount of enrichment natural gas present in the overall reformed gases. By varying the flow of the natural gas to the stage I burner, keeping the oxygen supplied thereto in near stoichiometric proportion, and proportionately varying the flow of natural gas to Stage II, the amount of reformed gas produced by the oxygen-fuel boost reformer may be varied, which in turn varies the total amount of reformed gas being supplied.

If the flow rate of the natural gas to the stage I burner is varied, and the supply of oxygen thereto is also varied to maintain stoichiometric proportion, and no change is made to the flow rates of the gases to stage II, the temperature of the resulting reformed gas from the oxygen-fuel boost reformer will change. The temperature of the secondary reformed gases from the oxygen-fuel boost reformer will increase with an increase in the burner natural gas flow rate and will decrease with a decrease the burner natural gas flow rate. The increase or decrease in the temperature of secondary gases will increase or decrease the temperature of the overall reformed gas supply when mixed with the primary reformed gases.

If the flow of natural gas to the stage II is varied, without any change in the flow rates of the gases to the burner of stage I, there will be a change in the amount of enrichment natural gas in the secondary reformed gas produced by the oxygen-fuel boost reformer and thus a change in the overall amount of enrichment natural gas in the overall reformed gas supply. However, in this case, a change in the flow rates to stage II produces a change in the temperature of the secondary reformed gas. An increase in flow rate of the natural gas to stage 2 will lower the temperature, while a decrease will cause a rise in temperature.

Thus, by selectively varying the flow rates of the gases to stage I and/or stage II, the amount of reformed gas, the temperature of the reformed gas, and the amount of enrichment gas of the overall reformed gas supply may be controlled without the necessity of any change in the operation of the main plant gas reformer or the use of other controls.

Proper control of the temperature of the reformed gas flowing to the shaft furnace is important for maintaining good quality of the direct reduced iron by preventing clustering at higher gas temperatures or reduced metallization rates at lower gas temperatures. The most efficient operation is to operate at the highest temperature which can be tolerated without clustering occurring.

While the invention has been described above with reference to specific embodiments thereof, it is apparent that many changes, modifications, and variations can be made without departing from the concepts disclosed herein. Accordingly, it is intended to embrace all such changes, modifications, and variations that fall within the scope of the appended claims.

What is claimed is:

1. A method of generating reformed gases, said method comprising:
   a. combusting a mixture of a first supply of a gaseous hydrocarbon and oxygen in a first stage to provide flame gases;
   b. passing said flame gases into a second stage in an axial direction;
   c. injecting a second supply of a gaseous hydrocarbon and oxygen into said second stage in a direction coaxial with said flame gases; and
   d. causing said flame gases to react with said second supply of said gaseous hydrocarbon in second stage to produce reformed hydrogen and carbon monoxide.

2. The method of claim 1 wherein said gaseous hydrocarbon is natural gas, methane, or propane, and said oxygen is commercial grade oxygen, air, or mixtures thereof.

3. The method of claim 2 wherein said combustion in said first stage produces carbon dioxide and water which are passed into said second stage.

4. The method of claim 2 wherein said second stage is in a mixing tube.

5. The method of claim 4 further comprising injecting said second supply of said gaseous hydrocarbon and said oxygen into said mixing tube in a swirling configuration.

6. A method of generating reformed gases to provide additional reformed gas capacity for existing reform gases, said method comprising:
   a. mounting a mixing tube in a location so that it is surrounded by existing reformed gases,
   b. combusting a mixture of a first supply of a gaseous hydrocarbon and oxygen in a first stage to provide flame gases;
   c. passing said flame gases into a second stage;
   d. injecting a second supply of a gaseous hydrocarbon and oxygen into said second stage;
   e. causing said flame gases to react with said second supply of said gaseous hydrocarbon in second stage to produce reformed hydrogen and carbon monoxide; and
   f. causing said produced reformed hydrogen and carbon monoxide to pass from said mixing tube into said existing gases.

7. The method of claim 6 further comprising using the heat from said existing reform gases to cause ignition of said first supply of said gaseous hydrocarbon and oxygen in said first stage.

8. The method of claim 2 further comprising cooling said first stage in which said combustion occurs.

9. The method of claim 2 further comprising preheating the said second supply of said gaseous hydrocarbon and oxygen before it enters said second stage.

10. The method of claim 2 further comprising preheating the said second supply of said gaseous hydrocarbon and oxygen before they enter said second stage, and using said preheated gaseous hydrocarbon and oxygen prior to its passage into said second stage to cool said first stage.

11. A gas reformer for generating reformed gases comprising:
   a. a burner for combusting a mixture of a first supply of a gaseous hydrocarbon and oxygen in a first stage to produce combustion products;
   b. an elongated mixing tube providing a second stage into which said combustion products are conveyed in an axial direction; and
   c. an injector for injecting a mixture of a second supply of a gaseous hydrocarbon and oxygen into said second stage in a direction co-axial with said combustion products for reaction with the combustion products of said first stage to produce reformed hydrogen and carbon monoxide.

12. The gas reformer of claim 11 wherein said gaseous hydrocarbon is natural gas, methane, or propane, and said oxygen is commercial grade oxygen, air, or mixtures thereof.

13. The gas reformer of claim 11 wherein said burner includes a venturi mixer including a venturi having a divergent section opening into said mixing tube, a chamber about said venturi for receiving said second supply of said gaseous hydrocarbon and oxygen, said chamber opening into said mixing tube downstream of the divergent section of said venturi.

14. The gas reformer of claim 13 further including a swirler at the opening of said chamber into said mixing tube to impart a swirling motion to said second supply of said gaseous hydrocarbon and oxygen as it enters said mixing tube.

15. The gas reformer of claim 13 wherein said mixing tube has a refractory lining.

16. The gas reformer of claim 11 wherein said burner includes a tube having a nozzle at the forward end thereof for receiving said first supply of said gaseous hydrocarbon, a first chamber surrounding said tube for receiving said first supply of oxygen, and a combustion chamber forward of said nozzle opening into said mixing tube, a tubular cooling jacket surrounding said combustion chamber, said cooling jacket having inlet and outlet ports for the passage of cooling fluid into and out of said cooling jacket, said nozzle of said burner tube and said chamber opening into said combustion chamber for passage of said first supply of said gaseous hydrocarbon and oxygen into said combustion chamber for combustion therein, a second chamber for receiving said second supply of said gaseous hydrocarbon and oxygen and having an opening into said mixing tube downstream of said combustion chamber for passage of said second supply of said gaseous hydrocarbon and oxygen into said mixing tube to mix with the products of combustion from said combustion chamber.

17. The gas reformer of claim 16 further including a swirler at the opening of said second chamber into said mixing tube to provide a swirling motion to said second supply of said gaseous hydrocarbon and oxygen as it enters said mixing tube.

18. The gas reformer of claim 17 further including a swirler at the opening of said first chamber into said combustion chamber to impart a swirling motion to said first supply of oxygen as it enters said combustion chamber.

19. The gas reformer of claim 11 wherein said burner includes a burner tube for attachment to a source of said first supply of gaseous and having a nozzle at its downstream end, a chamber surrounding said burner tube for connection to a source of said first supply of oxygen and having a nozzle at its downstream end, said nozzles opening into a combustion chamber, said mixing tube having a plurality of longitudinal extending annular passageways extending axially in said mixing tube, said passageways including a first outer passageway extending forwardly in said mixing tube, a return passageway connected to said outer passageway and extending rearward in said mixing tube, and a inner passageway connected to said return passageway at its rearward end and opening into said mixing tube at its forward end at a point space axially rearward of the forward end of said mixing tube, said inner passageway surrounding said combustion chamber, said outer passageway having entrance means for said second supply of said gaseous hydrocarbon and oxygen into said passageway adjacent its rearward end, said second supply of said gaseous hydrocarbon and oxygen passing through said passageways and entering said mixing tube at the forward end of said inner passageway downstream of said combustion chamber.

20. The gas reformer of claim 19 wherein said chamber has a swirler at its opening upstream of said nozzle to impart a swirling motion to said first supply of oxygen passing through said nozzle into said combustion chamber.

21. A method for supplementing the amount of reform gas used in direct reduced iron plants wherein primary reformed gas is supplied to a furnace from a primary reformer and passed through the iron ore to produce iron; said method comprising,
   a. combusting a mixture of a first supply of a gaseous hydrocarbon and oxygen to produce carbon dioxide and water;
   b. passing said carbon dioxide and water into a second stage;
   c. injecting a second supply of a gaseous hydrocarbon and oxygen into a second stage;
   d. causing said carbon dioxide and water to react with said second supply of said gaseous hydrocarbon in said second stage to produce secondary reformed hydrogen and carbon monoxide; and
   e. injecting said secondary reformed hydrogen and carbon monoxide into the path of the primary reformed gas to the furnace.

22. The method of claim 21 wherein said gaseous hydrocarbon is natural gas, methane, or propane, and said oxygen is commercial grade oxygen, air, or mixtures thereof.

23. The method of claim 22 wherein said second stage is in a mixing tube extending into the path of the primary reformed gas being supplied to said furnace.

24. The method of claim 22 further comprising injecting said second supply of said gaseous hydrocarbon and oxygen into said mixing tube in a swirling configuration.

25. The method of claim 22 wherein said mixing tube is mounted in an existing header containing reformed gases from said primary reformer, and further comprising using the heat from the existing reformed gases to initiate the initial combustion of said first supply of said gaseous hydrocarbon and oxygen in said first stage.

26. The method of claim 22 further comprising injecting excess gaseous hydrocarbon into said stage II to provide enrichment natural gas for use in the direct reduced iron process.

27. The method of claim 26 further comprising controlling the amount of enrichment natural gas in the reformed gas passing to said furnace by selectively varying the flow rate of said second supply of said gaseous hydrocarbon to said second stage.

28. The method of claim 22 further comprising controlling the temperature and/or amount of the reformed gas passing to said furnace by selectively varying the flow rates of said first supply of gaseous hydrocarbon and oxygen to said first stage and/or the flow rate of said second supply of said gaseous hydrocarbon to said second stage.

29. A gas reformer for generating supplemental reformed gases in a direct reduced iron plant wherein primary reformed gas is supplied through a path from a primary reformer to a furnace and passed through the iron ore to produce iron; said reformer comprising:
   a. a burner for combusting a mixture of a first supply of a gaseous hydrocarbon and oxygen in a first stage to produce combustion products;
   b. an elongated mixing tube providing a second stage into which said combustion products are conveyed, said mixing tube opening into the path of the reformed gases to said furnace; and
   c. an injector for injecting a mixture of a second supply of a gaseous hydrocarbon and oxygen into said second stage for reaction with the combustion products from said first stage to produce reformed hydrogen and carbon monoxide which exit said mixing tube and enter said path of said reformed gases.

30. The gas reformer of claim 29 wherein said gaseous hydrocarbon is natural gas, methane, or propane, and said oxygen is commercial grade oxygen, air, or mixtures thereof.

31. The gas reformer of claim 11 wherein said burner includes a tube having a nozzle at the forward end thereof for receiving said first supply of said gaseous hydrocarbon, a first chamber surrounding said tube for receiving said first supply of oxygen, and a combustion chamber forward of said nozzle and opening into said mixing tube, said nozzle and said first chamber opening into said combustion chamber for passage of said first supply of said gaseous hydrocarbon and said first supply of said oxygen into said combustion chamber for combustion therein.

\* \* \* \* \*